US011659029B2

(12) United States Patent
Pannem et al.

(10) Patent No.: US 11,659,029 B2
(45) Date of Patent: May 23, 2023

(54) METHOD AND SYSTEM FOR DISTRIBUTED MULTI-CLOUD DIAGNOSTICS

(71) Applicant: VMWARE, INC., Palo Alto, CA (US)

(72) Inventors: Hemanth Kumar Pannem, Palo Alto, CA (US); Abhinav Vijay Bhagwat, Pune (IN); Uday Suresh Masurekar, Palo Alto, CA (US); Amol Kanitkar, Pune (IN); Aniket Deole, Palo Alto, CA (US)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 17/020,955

(22) Filed: Sep. 15, 2020

(65) Prior Publication Data

US 2021/0377338 A1 Dec. 2, 2021

(30) Foreign Application Priority Data

May 29, 2020 (IN) .............................. 202041022580

(51) Int. Cl.
*G06F 15/173* (2006.01)
*H04L 67/1029* (2022.01)
*H04L 43/10* (2022.01)
*H04L 43/065* (2022.01)
*H04L 43/12* (2022.01)

(52) U.S. Cl.
CPC ........ *H04L 67/1029* (2013.01); *H04L 43/065* (2013.01); *H04L 43/10* (2013.01); *H04L 43/12* (2013.01)

(58) Field of Classification Search
CPC ... H04L 67/1029; H04L 43/12; H04L 43/065; H04L 43/10

USPC ..... 709/224, 203, 217; 370/235.1, 256, 329, 370/241
See application file for complete search history.

(56) References Cited

U.S. PATENT DOCUMENTS

| | | | | |
|---|---|---|---|---|
| 7,092,794 B1* | 8/2006 | Hill | ...................... | H04L 67/125 700/108 |
| 8,982,733 B2* | 3/2015 | Bulusu | .................... | H04L 45/48 370/256 |
| 2009/0196181 A1* | 8/2009 | Retana | .................... | H04L 45/02 370/235.1 |
| 2009/0198760 A1* | 8/2009 | Schneider | ........... | G06F 11/3664 709/201 |

(Continued)

FOREIGN PATENT DOCUMENTS

| | | | |
|---|---|---|---|
| CN | 102263825 A | * 11/2011 | |
| CN | 108734023 A | * 11/2018 | |
| WO | WO-2018005744 A1 | * 1/2018 | ........... G06F 21/577 |

*Primary Examiner* — Thuong Nguyen
(74) *Attorney, Agent, or Firm* — Loza & Loza, LLP

(57) ABSTRACT

System and method for performing diagnostics in a multi-cloud system triggers a diagnostic workflow in a first cloud computing environment of the multi-cloud system in response to an event in the multi-cloud system and execute the diagnostic workflow in the first cloud computing environment by identifying components in the multi-cloud system that are affected by the event and obtaining probes for the identified components. For each component of the identified components, a sub-flow of the diagnostic workflow is started to run at least one probe of the obtained probes to generate a diagnostic result of the component. A diagnostic report is generated based on the diagnostic result of each component of the identified components.

20 Claims, 15 Drawing Sheets

(56) References Cited

U.S. PATENT DOCUMENTS

| | | | |
|---|---|---|---|
| 2009/0281995 A1* | 11/2009 | Mousavi | G06F 16/951 |
| 2013/0086203 A1* | 4/2013 | Avner | G06F 11/3495 709/217 |
| 2013/0205028 A1* | 8/2013 | Crockett | G06F 9/5066 709/226 |
| 2013/0212129 A1* | 8/2013 | Lawson | H04L 67/18 707/779 |
| 2013/0254326 A1* | 9/2013 | Weng | H04L 67/1097 709/215 |
| 2013/0326053 A1* | 12/2013 | Bauer | G06F 11/20 709/224 |
| 2014/0157242 A1* | 6/2014 | Campbell | G06F 11/366 717/131 |
| 2014/0304389 A1* | 10/2014 | Reavis | G06Q 30/02 709/224 |
| 2015/0195182 A1* | 7/2015 | Mathur | H04L 41/0866 714/27 |
| 2015/0227406 A1* | 8/2015 | Jan | G06F 11/0709 714/37 |
| 2015/0334634 A1* | 11/2015 | Jiang | H04W 4/20 370/329 |
| 2015/0341230 A1* | 11/2015 | Dave | H04L 41/5051 705/7.29 |
| 2016/0072693 A1* | 3/2016 | Michaelis | H04L 67/42 709/203 |
| 2016/0094418 A1* | 3/2016 | Raney | H04L 43/028 370/241 |
| 2016/0182309 A1* | 6/2016 | Maturana | H04L 41/145 709/224 |
| 2016/0274552 A1* | 9/2016 | Strohmenger | G06Q 10/06 |
| 2016/0282819 A1* | 9/2016 | Zeier | G05B 13/028 |
| 2017/0034010 A1* | 2/2017 | Fong | H04L 41/20 |
| 2017/0064021 A1* | 3/2017 | Serebro | H04M 15/41 |
| 2017/0097841 A1* | 4/2017 | Chang | H04L 67/10 |
| 2017/0215034 A1* | 7/2017 | Blowers | H04W 4/021 |
| 2017/0279968 A1* | 9/2017 | Fadili | H04N 7/147 |
| 2018/0077024 A1* | 3/2018 | Zhang | H04L 63/0272 |
| 2018/0217570 A1* | 8/2018 | Shah | G05B 19/042 |
| 2018/0357097 A1* | 12/2018 | Poort | G06F 8/61 |
| 2019/0089618 A1* | 3/2019 | Kludy | G06F 11/3006 |
| 2019/0163796 A1* | 5/2019 | Hodge | G06F 16/258 |
| 2019/0188107 A1* | 6/2019 | Alston | G06F 11/3495 |
| 2019/0210642 A1* | 7/2019 | Bender | B62D 15/025 |
| 2020/0089529 A1* | 3/2020 | Brownsword | G06F 16/1805 |
| 2020/0104882 A1* | 4/2020 | Allison | G06Q 30/0269 |
| 2020/0120027 A1* | 4/2020 | Mukherjee | H04L 61/1588 |
| 2020/0145299 A1* | 5/2020 | Do | H04L 41/0816 |
| 2020/0236121 A1* | 7/2020 | Spurlock | G06F 11/1456 |
| 2020/0303049 A1* | 9/2020 | Zhang | G06K 9/3233 |
| 2020/0374204 A1* | 11/2020 | Bader | H04L 67/125 |
| 2020/0412625 A1* | 12/2020 | Bagarolo | G06N 20/00 |
| 2021/0027883 A1* | 1/2021 | Kumar | G16H 30/40 |
| 2021/0297417 A1* | 9/2021 | Pogrebinsky | H04L 63/10 |

* cited by examiner

| # | NSP/H CM | Source | Destination | Interface Type | Protocol | Port | Service | Description | Probe Command | Message on Failure | Comment | Error/Warning |
|---|---|---|---|---|---|---|---|---|---|---|---|---|
| 1 | BOTH | HCX Manager | HCX Manager | Management | HTTPS | 443 | INTERCO NNECT \| NETWOR K_EXTEN SION | Is destination HCX manager reachable | HTTPS_CONNECT <remote HCX Manager> 443 GET <some_url> | HCX Manager cannot reach the remote HCX Manager (IP). | | |
| 2 | BOTH | HCX Manager | VC | Management | HTTPS | 443 | INTERCO NNECT | Inventory/ Operations | curl -k -I -X GET https://<VC>/sd k/vimService.wsdl - H "Content-type:text/xml" | HCX Manager is not able to reach the vCenter Server. | | Error |
| 3 | BOTH | HCX Manager | For each ESXi in the deployment cluster. | Management | HTTP | 80 | INTERCO NNECT | OVF Import | HTTP_CONNECT <Deployment_ESXi> 80 GET IP:80 equivalent of curl -I. -k -v http://10.92.195.106: 80 Returns 200 | HCX Manager cannot reach any ESXi in the deployment cluster. | If cannot reach even one single ESXi in the deploym ent cluster. If one or more ESXi are reachabl e then this error should be suppress ed. | Error |
| | | | | Management or VMotion?? | UDP | 902 | INTERCO NNECT | OVF Import | UDP_TRACEROUT E | HCX Manager cannot reach any ESXi in the deploy ment cluster for OVF deploy ment. | ditto | Inconclusive |

FIG. 9A

| | NSP/H CM | Source | Destination | Interface Type | Protocol | Port | Service | Description | Probe Command | Message on Failure | Comment | Error/Warning |
|---|---|---|---|---|---|---|---|---|---|---|---|---|
| 4 | BOTH | HCX Manager | HCX_WAN_IX | Management | HTTPS | 9443 | INTERCONNECT | Configuration / Status collection | HTTPS_CONNECT <HCX_WAN_IX> 9443 GET /status | HCX Manager cannot reach the IX appliance <IP Address> | | Error |
| | | | | | TCP | 8123 | BULK_MIGRATION DR | Initiate VR, DR operations | HTTPS_CONNECT <HCX_WAN_IX> 8123 GET <some_valid_url> | HCX Manager cannot reach the IX Appliance <IP Address> for Migration and DR operations. | | Error |
| | | | | | TCP | 443 | VMOTION | vMotion service status check Anything else?? | HTTPS_CONNECT <HCX_WAN_IX> 443 GET <some_valid_url> | HCX Manager cannot reach the IX Appliance <IP Address> for vMotion operations. | | Error |
| 5 | BOTH | HCX Manager | HCX_NET_EXT | Management | HTTPS | 9443 | NETWORK_EXTENSION | Configuration / Status collection | HTTPS_CONNECT <HCX_NET_EXT> 9443 GET /status | HCX Manager cannot reach the Network Extension Appliance <IP Address>. | | Error |

FIG. 9B

| | NSP/H CM | Source | Destination | Interface Type | Protocol | Port | Service | Description | Probe Command | Message on Failure | Comment | Error/Warning |
|---|---|---|---|---|---|---|---|---|---|---|---|---|
| 6 | BOTH | HCX Manager | Default GW and all GWs in static routes | Management | ARP | | INTERCO NNECT | Appliance Configuration | for each gw ARPING <gw> | HCX Manager is not able to reach the gateway <gw> for route <route> | | Warning? |
| 7 | BOTH | HCX Manager | DNS | Management | TCP/UDP | 53 | INTERCO NNECT | Appliance Configuration | TCPPing <DNS IP> 53 OR UDPPing <DNS IP> 53 | HCX Manager is not able to reach the DNS server <IP Address>. | If either TCP or UDP works then no error or warning. | Warning? Since if all addresses are IPs then DNS may not be needed. |
| 8 | BOTH | HCX_WAN_IX | VC | Management | HTTPS | 443 | INTERCO NNECT | Register host operation | curl -k -l -X GET https://<VC>/sd k/vimService.wsdl - H "Content-type:text/xml" | HCX IX Appliance is not able to reach the vCenter Server. | | Error |
| | | | | | UDP | 902 | VMOTION | Vmotion | UDP_TRACEROUT E | HCX IX Appliance is not able to reach the vCenter Server for vMotion. | | Inconclusive |

FIG. 9C

| | NSP/H CM | Source | Destination | Interface Type | Protocol | Port | Service | Description | Probe Command | Message on Failure | Comment | Error/Warning |
|---|---|---|---|---|---|---|---|---|---|---|---|---|
| 9 | BOTH | HCX_WAN_IX | For each ESXi in service clusters | VR | TCP | 902 | BULK/DR /RAV | Migration | HTTP_CONNECT <Deployment_ESXi> 80 GET IP:902 equivalent of<br><br>curl -L -k -v http://10.92.195.106:902<br><br>returns 220 VMware Authentication Daemon Version 1.10: SSL Required, ServerDaemonProtocol:SOAP, MKSDisplayProtocol=VNC , VMXARGS supported, NFCSSL supported\t | HCX IX Appliance is not able to reach the vCenter Server for migration. | | Flag the error only if not even one single host is reachable else flag warning. |
| | | | | VMotion | TCP | 8000 | VMOTION | VMOTION | TCP_CONNECT 8000 | HCX IX Appliance is not able to reach the ESXi Server for vMotion. | | |
| | | | | Management | TCP | 80 | BULK/DR | ESX Auth | HTTP_CONNECT <Deployment_ESXi> 80 GET IP:80 curl -L -k -v http://10.92.195.106:80<br><br>returns 200 | HCX IX Appliance is not able to reach the ESXi Server management for migration. | | |
| 10 | BOTH | HCX_WAN_IX | HCX_WAN_OPT | Uplink/Flex | HTTPS | 443 | WANOPT | Wanopt config/status | HTTPS_CONNECT 443 GET IP:443 equivalent of curl -k -v -L 192.0.2.2:443 returns 200 | HCX IX Appliance is not able to reach the HCX WAN OPT appliance. | | |

FIG. 9D

| | NSP/H CM | Source | Destination | Interface Type | Protocol | Port | Service | Description | Probe Command | Message on Failure | Comment | Error/Warning |
|---|---|---|---|---|---|---|---|---|---|---|---|---|
| 11 | Initiator/ HCM | HCX_WAN_IX | HCX_WAN_IX | Uplink | UDP UDP | 4500 500 - May not be used today. But we should keep this for future. | INTERCONNECT | Check peer connectivity | FOU_TRACE <PeerIP> 4500 OK #FOU_TRACE <PeerIP> 500 | HCX IX Appliance is not able to reach the peer IX appliance at <IP Address> | | |
| 12 | BOTH | HCX_WAN_IX | Default GW and all GWs in static routes | various interfaces | ARP | | INTERCONNECT | IX Appliance Configuration | for each gw arping <gw> | HCX IX Appliance is not able to reach the gateway <gw> for route <route> | | Error |
| 13 | BOTH | HCX_WAN_IX | DNS | Management | TCP/UDP | 53 | INTERCONNECT | IX Appliance Configuration | TCPPing <DNS IP> 53 OR UDPPing <DNS IP> 53 | HCX IX Appliance is not able to reach the DNS server <IP Address> | If either TCP or UDP works then no error or warning | Warning?? Since if all addresses are IPs then DNS may not be needed. |
| 14 | Initiator/ HCM | HCX_NET_EXT | HCX_NET_EXT | Uplink | UDP UDP | 500 4500 | NETWORK_EXTENSION | Check peer connectivity | UDPPing <PeerIP> 500 OR UDPPing <PeerIP> 4500 | HCX NE Appliance is not able to reach the peer NE appliance at <IP Address> | | |

FIG. 9E

| | NSP/H CM | Source | Destination | Interface Type | Protocol | Port | Service | Description | Probe Command | Message on Failure | Comment | Error/Warning |
|---|---|---|---|---|---|---|---|---|---|---|---|---|
| 15 | BOTH | HCX_NET_EXT | Default GW and all GWs in static routes | Management | ARP | | NETWORK_EXTENSION | IX Appliance Configuration | for each gw arping <gw> | HCX NE Appliance is not able to reach the gateway <gw> for route <route>. | | Error |
| 16 | BOTH | each ESXi in the service cluster | IX | Management | TCP | 31031, 44046 | BULK_MIGRATION, DR | VR operations | | ESXi <IP Address> is not able to reach the HCX IX Appliance <IP Address> for migration. | This operation cannot be automated. The manual command to test this should be documented. | Error if none of the ESXi can reach the IX appliance. Else if a few cannot reach then warning. |

FIG. 9F

METHOD AND SYSTEM FOR DISTRIBUTED MULTI-CLOUD DIAGNOSTICS

RELATED APPLICATIONS

Benefit is claimed under 35 U.S.C. 119(a)-(d) to Foreign Application Serial No. 202041022580 filed in India entitled "METHOD AND SYSTEM FOR DISTRIBUTED MULTI-CLOUD DIAGNOSTICS", on May 29, 2020, by VMware, Inc., which is herein incorporated in its entirety by reference for all purposes.

BACKGROUND

Growing adoption of cloud native applications allows enterprises to move to distributed application architectures in multi-cloud environments. However, failures may occur during the deployment of interconnected clouds in a multi-cloud environment or after the interconnected clouds are deployed in the multi-cloud environment. These failures can affect virtual appliance migrations between the interconnected clouds, and more importantly, extended networks across the interconnected clouds. For example, failures in a multi-cloud environment may happen (1) when communication ports are not open due to firewalls, (2) when connectivity issues arise due to misconfiguration, (3) when internal routing issues arise on customer networks, (4) when virtual appliances cannot reach the required systems, and/or (5) when prerequisites are not met before cloud deployment In some multi-cloud management schemes, failures in a multi-cloud environment have to be manually diagnosed and rectified. Sometimes, it can take hours or even days to address failures in a multi-cloud environment, which can cause customer dissatisfaction and wastage of resources. In some multi-cloud management schemes, diagnostics are confined to single site and single node. Moreover, data correlation from multiple clouds have to be done manually, which is error prone and can lead to faulty diagnosis. In addition, in these multi-cloud management schemes, there is no central place to view and identify problems quickly across all nodes and sites in a multi-cloud environment and/or to automatically trigger diagnostics in case of failures in the multi-cloud environment. Therefore, there is a need to perform diagnostics across multiple clouds in a multi-cloud environment and potentially rectify failures based on the diagnostics in the multi-cloud environment.

SUMMARY

System and method for performing diagnostics in a multi-cloud system triggers a diagnostic workflow in a first cloud computing environment of the multi-cloud system in response to an event in the multi-cloud system and execute the diagnostic workflow in the first cloud computing environment by identifying components in the multi-cloud system that are affected by the event and obtaining probes for the identified components. For each component of the identified components, a sub-flow of the diagnostic workflow is started to run at least one probe of the obtained probes to generate a diagnostic result of the component. A diagnostic report is generated based on the diagnostic result of each component of the identified components.

A computer-implemented method for performing diagnostics in a multi-cloud system in accordance with an embodiment of the invention comprises triggering a diagnostic workflow in a first cloud computing environment of the multi-cloud system in response to an event in the multi-cloud system, executing the diagnostic workflow in the first cloud computing environment by identifying components in the multi-cloud system that are affected by the event and obtaining probes for the identified components, for each component of the identified components, starting a sub-flow of the diagnostic workflow to run at least one probe of the obtained probes to generate a diagnostic result of the component, and generating a diagnostic report based on the diagnostic result of each component of the identified components. In some embodiments, the steps of this method are performed when program instructions contained in a non-transitory computer-readable storage medium are executed by one or more processors.

A system for performing diagnostics in a multi-cloud system in accordance with an embodiment of the invention comprises memory and at least one processor configured to trigger a diagnostic workflow in a first cloud computing environment of the multi-cloud system in response to an event in the multi-cloud system, execute the diagnostic workflow in the first cloud computing environment by identifying a plurality of components in the multi-cloud system that are affected by the event and obtaining a plurality of probes for the identified components, for each component of the identified components, start a sub-flow of the diagnostic workflow to run at least one probe of the obtained probes to generate a diagnostic result of the component and generate a diagnostic report based on the diagnostic result of each component of the identified components.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

FIGS. 9A-9F depict a list of examples of triggers and probes that can be used by the diagnostic processes illustrated in FIGS. 3 and 8.

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," "one aspect," "an aspect," "various aspects," or similar language means that a particular feature, structure, or characteristic described in connection with the indicated embodiment is included in at least one embodiment of the present invention. Thus, the phrases "in one embodiment," "in an embodiment," "in one aspect," "in an aspect," "in various aspects," and similar language throughout this specification may, but do not necessarily, all refer to the same embodiment.

Figure 1:
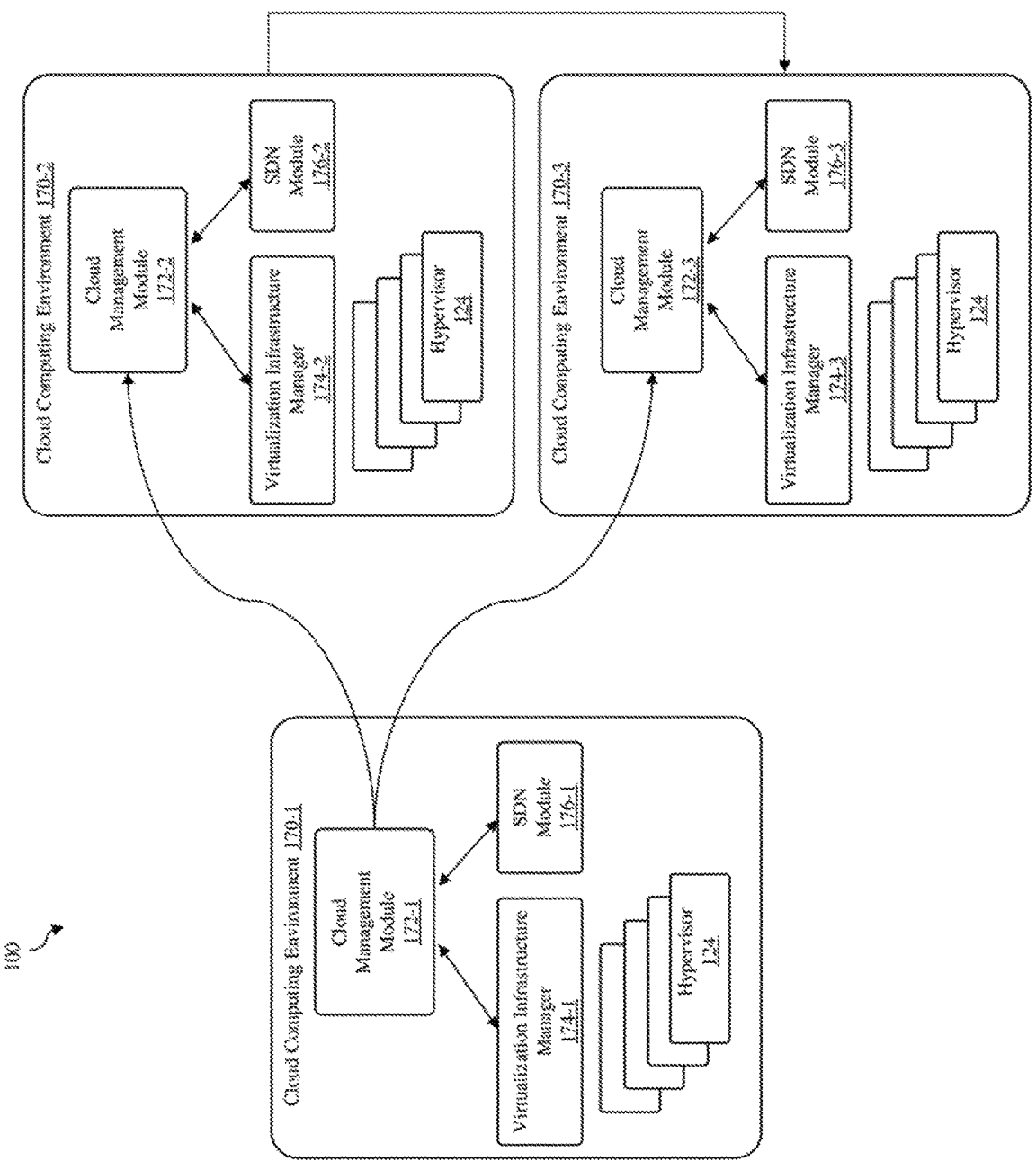
FIG. 1 is a block diagram of a multi-cloud system that may be used to describe a method and system for distributed multi-cloud diagnostics in accordance with various aspects of the invention.

Turning now to FIG. 1, a block diagram of a multi-cloud system 100 in which the present invention may be implemented in accordance with an embodiment of the invention is shown. In the embodiment depicted in FIG. 1, the multi-cloud system 100 includes three cloud computing environments 170-1, 170-2, 170-3 that are inter-connected. Each of the three cloud computing environments 170-1, 170-2, 170-3 can be a private cloud computing environment or a public cloud computing environment. The multi-cloud system 100 is configured to provide a common platform for managing and executing commands, instructions, and/or workloads seamlessly between the cloud computing environments. The multi-cloud system 100 can be used in cloud computing and cloud storage systems for offering software as a service (SaaS) cloud services. Examples of cloud architectures include the VMware Cloud architecture software, Amazon EC2™ web service, and OpenStack™ open source cloud computing service. SaaS cloud service is a type of software distribution cloud service in which a service provider hosts software applications for customers in a cloud environment. Although the multi-cloud system 100 is shown in FIG. 1 includes three cloud computing environments, in other embodiments, the multi-cloud system 100 may include more than three cloud computing environments or less than three cloud computing environments.

In the multi-cloud system 100 depicted in FIG. 1, each cloud computing environment 170-1, 170-2, or 170-3 includes a cloud management module 172-1, 172-2 or 172-3, a virtualization infrastructure manager (VIM) 174-1, 174-2 or 174-3, a software defined network (SDN) module 176-1, 176-2 or 176-3, and one or more hypervisors 124. The cloud management modules 172-1, 172-2, 172-3 are configured to manage and integrate virtualized computing resources provided by the cloud computing environments 170-1, 170-2, 170-3 in order to form a unified computing platform. In some embodiments, at least one of the cloud management modules 172-1, 172-2,172-3 is a component of the HCX-Cloud product or the HCX-Enterprise product, which is provided by VMware, Inc. The cloud management modules 172-1, 172-2, 172-3 may abstract computing resources of the cloud computing environments 170-1, 170-2, 170-3, presenting such resources to applications as one continuous cloud. In addition, the cloud management modules 172-1, 172-2, 172-3 may create high-performance, secured and optimized interconnects between the cloud computing environments 170-1, 170-2, 170-3, providing infrastructure hybridity that enables application mobility and disaster recovery across the cloud computing environments 170-1, 170-2, 170-3. The VIMs 174-1, 174-2, 174-3 and the SDN modules 176-1, 176-2, 176-3 are configured to manage infrastructure and network virtualization, respectively, in the corresponding cloud computing environments 170-1, 170-2, 170-3. As an example, at least one of the VIMs 174-1, 174-2, 174-3 is the VMware vCenter Server® product made available from VMware, Inc. In addition, at least one of the SDN modules 176-1, 176-2, 176-3 is the VMware NSX product made available from VMware, Inc. In some embodiments, the VIMs 174-1, 174-2, 174-3 and the SDN modules 176-1, 176-2, 176-3 are dependent components that register with the corresponding cloud management modules 172-1, 172-2, 172-3.

In the multi-cloud system 100 depicted in FIG. 1, the cloud computing environment 170-1 is inter-connected to the cloud computing environments 170-2, 170-3. The cloud computing environment 170-2 is interconnected to the cloud computing environments 170-3. In some embodiments, the cloud management module 172-1, 172-2, or 172-3 is configured to trigger a diagnostic workflow in a corresponding cloud computing environment 170-1, 170-2, or 170-3 of the multi-cloud system 100 in response to an event in the multi-cloud system 100 and execute the diagnostic workflow in the corresponding cloud computing environment 170-1, 170-2, or 170-3 by identifying components in the multi-cloud system 100 that are affected by the event and obtaining probes for the identified components. A probe may be a software program that can be inserted in or adjacent to a component of the multi-cloud system 100 to monitor or collect data about operation status and/or network activity of the component. A probe can be any type of cross-cloud probes. Examples of probes include, without being limited to, a local area network (LAN) Transmission Control Protocol (TCP) probe, a LAN User Datagram Protocol (UDP) probe, a wide area network (WAN) trace probe, a virtual machine guest operation probe, and an interface counter probe. In these embodiments, the cloud management module 172-1, 172-2, or 172-3 is further configured to, for each component of the identified components, start a sub-flow of the diagnostic workflow to run at least one probe of the obtained probes to generate a diagnostic result of the component, and generate a diagnostic report based on the diagnostic result of each component of the identified components. For example, assume that there is a cross cloud migration failure occurred between the cloud computing environment 170-1 and the cloud computing environment 170-2, the cross-cloud diagnostics are triggered automatically upon this event. The cloud management module 172-1 may discover a need to run a diagnostic workflow. Depending on the event, the cloud management module 172-1 can identify the affected components and nodes and identify probes to run. A main workflow can begin from the cloud computing environment 170-1 (or wherever the operation is initiated) and construct one or more required probes. The main workflow can then spawn one or more sub-workflows to be sent to one or more identified cloud locations to perform one or more additional actions. These sub-workflows may or may not run in parallel. Once all the sub-workflows are complete, the main workflow collects the results, correlates data and generates a report.

Figure 2:
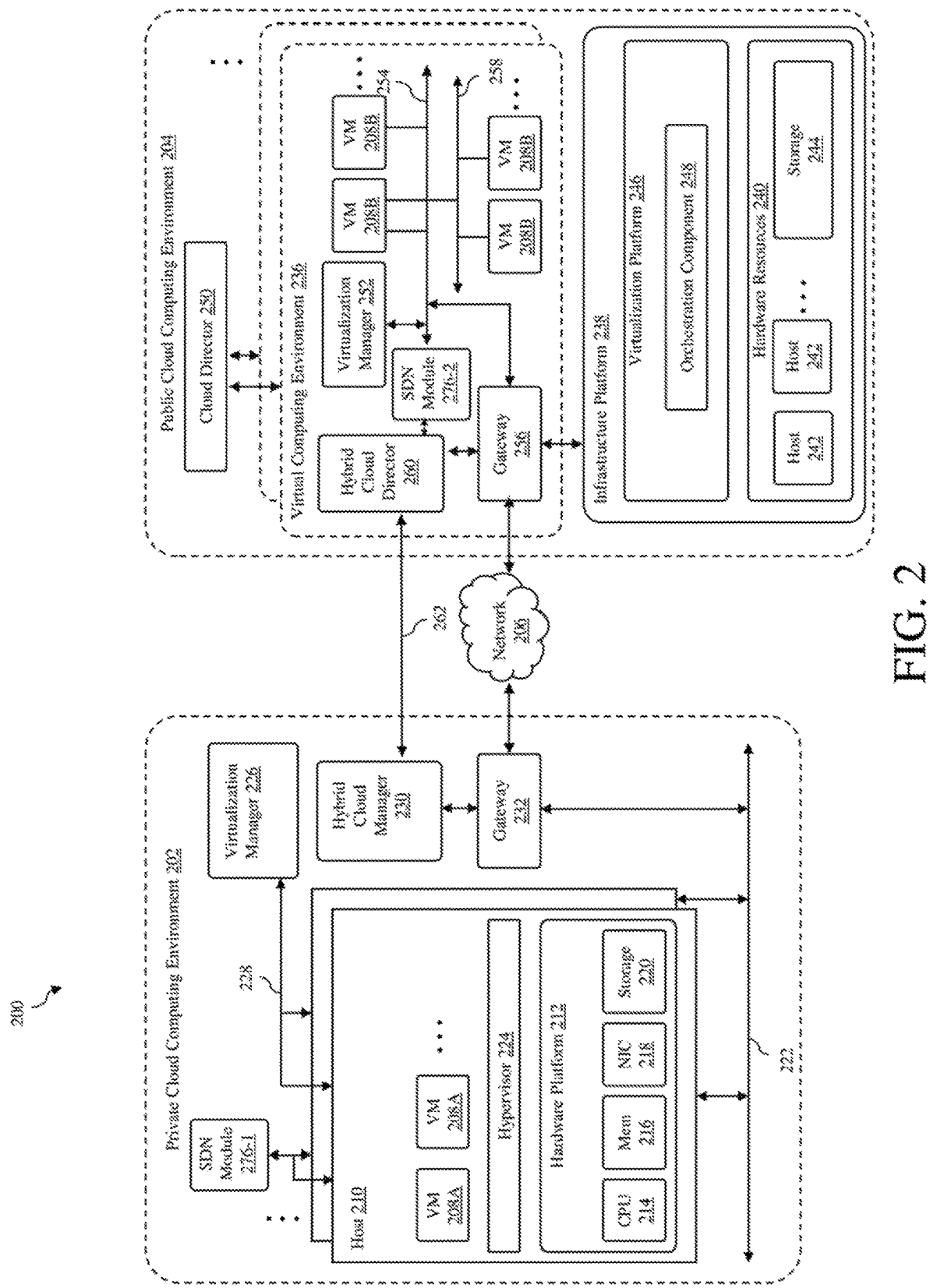
FIG. 2 is a block diagram of a hybrid cloud system that may be used to describe a method and system for distributed multi-cloud diagnostics in accordance with various aspects of the invention.

Turning now to FIG. 2, a block diagram of a hybrid cloud system 200 in which the present invention may be implemented in accordance with an embodiment of the invention is shown. The hybrid cloud system 200 depicted in FIG. 2 is an embodiment of the multi-cloud system 100 depicted in FIG. 1. However, the multi-cloud system 100 depicted in FIG. 1 is not limited to the embodiment depicted in FIG. 2. In the embodiment depicted in FIG. 2, the hybrid cloud system 200 includes at least one private cloud computing environment 202 and at least one public cloud computing environment 204 that are connected via a network 206. The private cloud computing environment 202 and the public cloud computing environment 204 depicted in FIG. 2 are embodiments of the cloud computing environments 170-1, 170-2, 170-3 depicted in FIG. 1. However, the cloud computing environments 170-1, 170-2, 170-3 depicted in FIG. 1 are not limited to the embodiments depicted in FIG. 2. The hybrid cloud system 200 is configured to provide a common platform for managing and executing commands, instructions, and/or workloads seamlessly between the private and public cloud computing environments. In one embodiment, the private cloud computing environment 202 may be controlled and administrated by a particular enterprise or business organization, while the public cloud computing environment 204 may be operated by a cloud computing service provider and exposed as a service available to account holders, such as the particular enterprise in addition to other enterprises. In some embodiments, the private cloud computing environment 202 may be a private or on-premise data center. The hybrid cloud system can be used in cloud computing and cloud storage systems for offering software as a service (SaaS) cloud services.

The private cloud computing environment 202 and the public cloud computing environment 204 of the hybrid cloud system 200 include computing and/or storage infrastructures to support a number of virtual computing instances 208A and 208B. As used herein, the term "virtual computing instance" refers to any software processing entity that can run on a computer system, such as a software application, a software process, a VM, e.g., a VM supported by virtualization products of VMware, Inc., and a software "container", e.g., a Docker container. In some embodiments of this disclosure, the virtual computing instances will be described as being virtual machines, although embodiments of the invention described herein are not limited to virtual machines.

Continuing to refer to FIG. 2, the private cloud computing environment 202 of the hybrid cloud system 200 includes one or more host computer systems ("hosts") 210. The hosts may be constructed on a server grade hardware platform 212, such as an x86 architecture platform. As shown, the hardware platform of each host may include conventional components of a computing device, such as one or more processors (e.g., CPUs) 214, system memory 216, a network interface 218, storage system 220, and other I/O devices such as, for example, a mouse and a keyboard (not shown). The processor 214 is configured to execute instructions such as, for example, executable instructions that may be used to perform one or more operations described herein and may be stored in the memory 216 and the storage system 220. The memory 216 is volatile memory used for retrieving programs and processing data. The memory 216 may include, for example, one or more random access memory (RAM) modules. The network interface 218 enables the host 210 to communicate with another device via a communication medium, such as a network 222 within the private cloud computing environment. The network interface 218 may be one or more network adapters, also referred to as a Network Interface Card (NIC). The storage system 220 represents local storage devices (e.g., one or more hard disks, flash memory modules, solid state disks and optical disks) and/or a storage interface that enables the host to communicate with one or more network data storage systems. Example of a storage interface is a host bus adapter (HBA) that couples the host to one or more storage arrays, such as a storage area network (SAN) or a network-attached storage (NAS), as well as other network data storage systems. The storage system 220 is used to store information, such as executable instructions, cryptographic keys, virtual disks, configurations and other data, which can be retrieved by the host.

Each host 210 may be configured to provide a virtualization layer that abstracts processor, memory, storage, and networking resources of the hardware platform 212 into the virtual computing instances, e.g., the virtual machines 208A, that run concurrently on the same host. The virtual machines run on top of a software interface layer, which is referred to herein as a hypervisor 224, which enables sharing of the hardware resources of the host by the virtual machines. The hypervisor 224 depicted in FIG. 2 is an embodiment of the hypervisor 124 depicted in FIG. 1. However, the hypervisor 124 depicted in FIG. 1 is not limited to the embodiment depicted in FIG. 2. One example of the hypervisor 224 that may be used in an embodiment described herein is a VMware ESXi™ hypervisor provided as part of the VMware vSphere® solution made commercially available from VMware, Inc. The hypervisor 224 may run on top of the operating system of the host or directly on hardware components of the host. For other types of virtual computing instances, the host may include other virtualization software platforms to support those virtual computing instances, such as Docker virtualization platform to support software containers.

The private cloud computing environment 202 may include a virtualization manager 226 that communicates with the hosts 210 via a management network 228 and an SDN module 276-1 that manages network virtualization in the private cloud computing environment 202. The virtualization manager 226 depicted in FIG. 2 is an embodiment of the VIMs 174-1, 174-2, 174-3 depicted in FIG. 1. However, the VIMs 174-1, 174-2, 174-3 depicted in FIG. 1 are not limited to the embodiment depicted in FIG. 2. In one embodiment, the virtualization manager 226 is a computer program that resides and executes in a computer system, such as one of the hosts, or in a virtual computing instance, such as one of the virtual machines 208A running on the hosts. One example of the virtualization manager 226 is the VMware vCenter Server® product made available from VMware, Inc. The virtualization manager 226 is configured to carry out administrative tasks for the private cloud computing environment, including managing the hosts, managing the VMs running within each host, provisioning VMs, migrating VMs from one host to another host, and load balancing between the hosts. The SDN module 276-1 depicted in FIG. 2 is an embodiment of the SDN modules 176-1, 176-2, 176-3 depicted in FIG. 1. However, the SDN modules 176-1, 176-2, 176-3 depicted in FIG. 1 are not limited to the embodiment depicted in FIG. 2.

In one embodiment, the private cloud computing environment 202 includes a hybrid cloud manager 230 configured to manage and integrate computing resources provided by the private cloud computing environment 202 with computing resources provided by the public cloud computing environment 204 to form a unified "hybrid" computing platform. The hybrid cloud manager 230 depicted in FIG. 2 is an embodiment of the cloud management modules 172-1, 172-2, 172-3 depicted in FIG. 1. However, the cloud management modules 172-1, 172-2, 172-3 depicted in FIG. 1 are not limited to the embodiment depicted in FIG. 2. The hybrid cloud manager is configured to deploy virtual computing instances, e.g., virtual machines 208A, in the private cloud computing environment, transfer VMs from the private cloud computing environment to the public cloud computing environment 204, and perform other "cross-cloud" administrative tasks. In one implementation, the hybrid cloud manager 230 is a module or plug-in to the virtualization manager 226, although other implementations may be used, such as a separate computer program executing in any computer system or running in a virtual machine in one of the hosts.

In one embodiment, the hybrid cloud manager 230 is configured to control network traffic into the network 206 via a gateway device 232, which may be implemented as a virtual appliance. The gateway device 232 is configured to provide the virtual machines 208A and other devices in the private cloud computing environment 202 with connectivity to external devices via the network 206. The gateway device 232 may manage external public Internet Protocol (IP) addresses for the virtual machines 208A and route traffic incoming to and outgoing from the private cloud computing environment and provide networking services, such as firewalls, network address translation (NAT), dynamic host configuration protocol (DHCP), load balancing, and virtual private network (VPN) connectivity over the network 206.

The public cloud computing environment 204 of the hybrid cloud system 200 is configured to dynamically provide an enterprise (or users of an enterprise) with one or more virtual computing environments 236 in which an administrator of the enterprise may provision virtual computing instances, e.g., the virtual machines 208B, and install and execute various applications in the virtual computing instances. The public cloud computing environment 204 includes an infrastructure platform 238 upon which the virtual computing environments can be executed. In the particular embodiment of FIG. 2, the infrastructure platform 238 includes hardware resources 240 having computing resources (e.g., hosts 242), storage resources (e.g., one or more storage array systems, such as a storage area network (SAN) 244), and networking resources (not illustrated), and a virtualization platform 246, which is programmed and/or configured to provide the virtual computing environments 236 that support the virtual machines 208B across the hosts 242. The virtualization platform 246 may be implemented using one or more software programs that reside and execute in one or more computer systems, such as the hosts 242, or in one or more virtual computing instances, such as the virtual machines 208B, running on the hosts.

In one embodiment, the virtualization platform 246 includes an orchestration component 248 that provides infrastructure resources to the virtual computing environments 236 responsive to provisioning requests. The orchestration component may instantiate VMs according to a requested template that defines one or more VMs having specified virtual computing resources (e.g., compute, networking and storage resources). Further, the orchestration component may monitor the infrastructure resource consumption levels and requirements of the virtual computing environments and provide additional infrastructure resources to the virtual computing environments as needed or desired. In one example, similar to the private cloud computing environment 202, the virtualization platform may be implemented by running on the hosts 242 VMware ESXi™-based hypervisor technologies provided by VMware, Inc. However, the virtualization platform may be implemented using any other virtualization technologies, including Xen®, Microsoft Hyper-V® and/or Docker virtualization technologies, depending on the virtual computing instances being used in the public cloud computing environment 204.

In one embodiment, the public cloud computing environment 204 may include a cloud director 250 that manages allocation of virtual computing resources to an enterprise. The cloud director may be accessible to users via a REST (Representational State Transfer) API (Application Programming Interface) or any other client-server communication protocol. The cloud director may authenticate connection attempts from the enterprise using credentials issued by the cloud computing provider. The cloud director receives provisioning requests submitted (e.g., via REST API calls) and may propagate such requests to the orchestration component 248 to instantiate the requested virtual machines (e.g., the virtual machines 208B). One example of the cloud director is the VMware vCloud Director® product from VMware, Inc. The public cloud computing environment 204 may be VMware Cloud™ (VMC) on Amazon Web Services (AWS).

In one embodiment, at least some of the virtual computing environments 236 may be configured as virtual data centers. Each virtual computing environment includes one or more virtual computing instances, such as the virtual machines 208B, an SDN module 276-2 configured to manage network virtualization of the virtual computing environment, and one or more virtualization managers 252. The SDN module 276-2 depicted in FIG. 2 is an embodiment of the SDN modules 176-1, 176-2, 176-3 depicted in FIG. 1. However, the SDN modules 176-1, 176-2, 176-3 depicted in FIG. 1 are not limited to the embodiment depicted in FIG. 2. The virtualization managers 252 depicted in FIG. 2 are embodiments of the VIMs 174-1, 174-2, 174-3 depicted in FIG. 1. However, the VIMs 174-1, 174-2, 174-3 depicted in FIG. 1 are not limited to the embodiment depicted in FIG. 2. The virtualization managers 252 may be similar to the virtualization manager 226 in the private cloud computing environment 202. One example of the virtualization manager 252 is the VMware vCenter Server® product made available from VMware, Inc. Each virtual computing environment may further include one or more virtual networks 254 used to communicate between the virtual machines 208B running in that environment and managed by at least one networking gateway device 256, as well as one or more isolated internal networks 258 not connected to the gateway device 256. The gateway device 256, which may be a virtual appliance, is configured to provide the virtual machines 208B and other components in the virtual computing environment 236 with connectivity to external devices, such as components in the private cloud computing environment 202 via the network 206. The gateway device 256 operates in a similar manner as the gateway device 232 in the private cloud computing environment.

In one embodiment, each virtual computing environment 236 includes a hybrid cloud director 260 configured to communicate with the corresponding hybrid cloud manager 230 in the private cloud computing environment 202 to enable a common virtualized computing platform between the private and public cloud computing environments. The hybrid cloud director 260 depicted in FIG. 2 is an embodiment of the cloud management modules 172-1, 172-2, 172-3 depicted in FIG. 1. However, the cloud management modules 172-1, 172-2, 172-3 depicted in FIG. 1 are not limited to the embodiment depicted in FIG. 2. The hybrid cloud director may communicate with the hybrid cloud manager using Internet-based traffic via a VPN tunnel established between the gateways 232 and 256, or alternatively, using a direct connection 262. The hybrid cloud director and the corresponding hybrid cloud manager facilitate cross-cloud migration of virtual computing instances, such as virtual machines 208A and 208B, between the private and public computing environments. This cross-cloud migration may include both "cold migration" in which the virtual machine is powered off during migration, as well as "hot migration" in which the virtual machine is powered on during migration. As an example, the hybrid cloud director 260 may be a component of the HCX-Cloud product and the hybrid cloud manager 230 may be a component of the HCX-Enterprise or HCX-connector product, which is provided by VMware, Inc.

Figure 3:
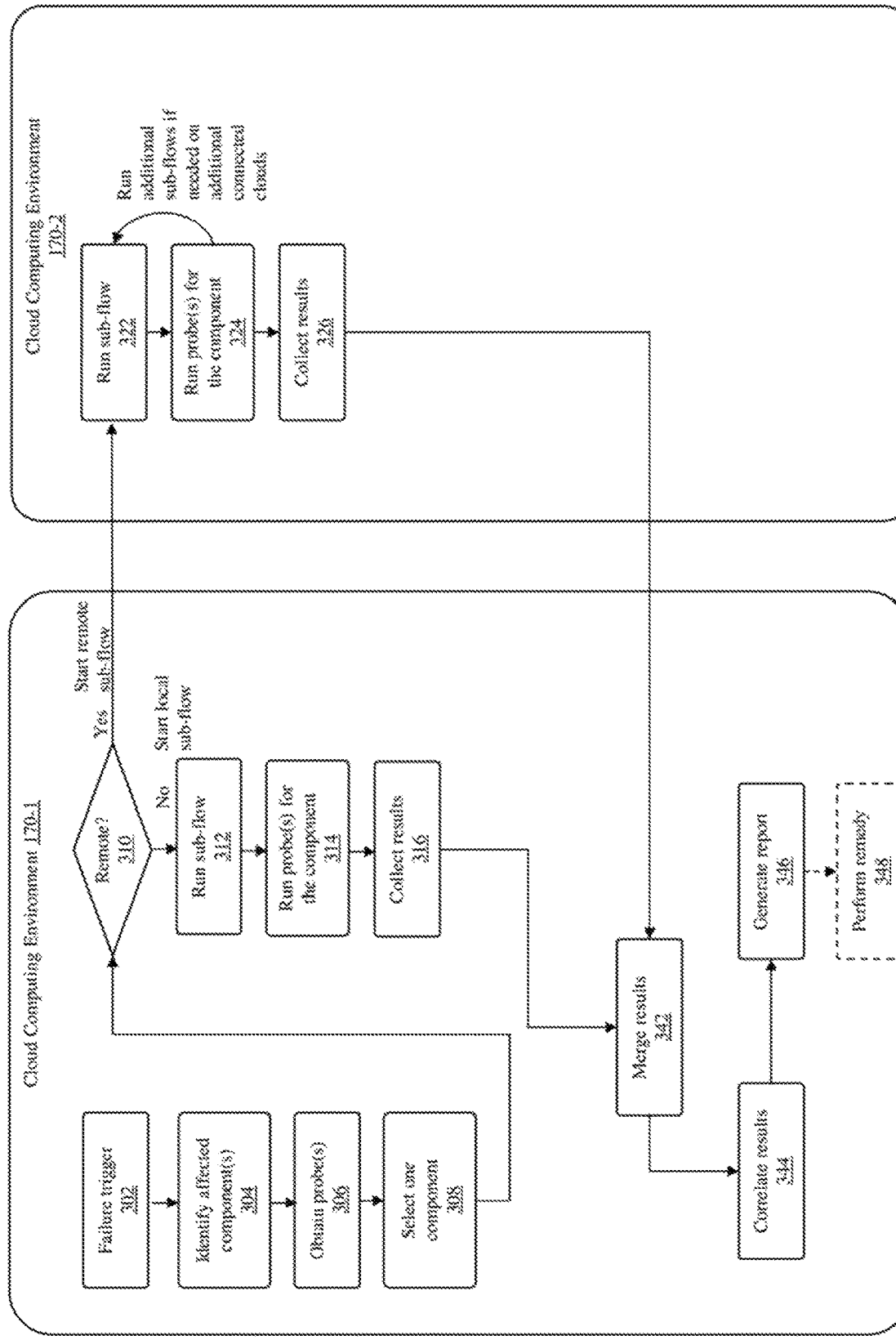
FIG. 3 is a flow diagram of a cross-cloud diagnostic process that can be implemented in the multi-cloud system of FIG. 1 in accordance with various aspects of the invention.

FIG. 3 is a flow diagram of a cross-cloud diagnostic process that can be implemented in the multi-cloud system 100 in accordance with various aspects of the invention. In the flow diagram shown in FIG. 3, the cross-cloud diagnostic process is triggered in the cloud computing environment 170-1 automatically upon a failure event, for example, a cross cloud migration failure that has occurred between the cloud computing environment 170-1 and the cloud computing environment 170-2. For example, the cloud management module 172-1 may run a diagnostic workflow in response to a failure event in the multi-cloud system 100. Depending on the failure event, the cloud management module 172-1 can identify the affected components and nodes within the cloud computing environment 170-1 or outside the cloud computing environment 170-1 and identify probes within the cloud computing environment 170-1 or outside the cloud computing environment 170-1 to run. A main workflow can begin from the cloud computing environment 170-1 (or wherever the operation is initiated) and construct one or more probes. The main workflow can then spawn one or more sub-workflows to be sent to one or more identified cloud locations to perform one or more additional actions. These sub-workflows may or may not run in parallel. Once all the sub-workflows are complete, the main workflow collects the results, correlates data and generates a report.

In the flow diagram shown in FIG. 3, the cross-cloud diagnostic process starts from step 302. At step 302, a diagnostic workflow is triggered by a failure event in the multi-cloud system 100, for example, in the cloud management module 172-1 of the cloud computing environment 170-1. At step 304, one or more components in the multi-cloud system 100 that are affected by the failure event are identified as part of the diagnostic workflow, for example, by the cloud management module 172-1. At step 306, based on affected components, one or more probes are obtained or constructed as part of the diagnostic workflow, for example, by the cloud management module 172-1. At step 308, each one of the affected components is selected for processing, for example, by the cloud management module 172-1, either in parallel or in a sequence.

At step 310, for each of the affected components, it is determined if the component is remote to the cloud computing environment 170-1 in which the diagnostic workflow is triggered. If the component is not remote (i.e., local) to the cloud computing environment 170-1 in which the diagnostic workflow is triggered, a local sub-flow (also referred to as a sub-workflow) is started and run in the cloud computing environment 170-1, for example, by the cloud management module 172-1 at step 312. Subsequently, at step 314, probes for the component are run in the cloud computing environment 170-1, for example, by the cloud management module 172-1, and the corresponding results are collected at step 316. If the component is remote to the cloud computing environment 170-1 in which the diagnostic workflow is triggered, a remote subflow is started and run in the cloud computing environment 170-2, for example, by the cloud management module 172-2 at step 322. Subsequently, at step 324, probes for the component is run in the cloud computing environment 170-2, for example, by the cloud management module 172-2. One or more additional sub-flows can be run if needed on one or more additional connected clouds. The corresponding results are collected at step 326.

At step 342, results collected from the local sub-flow in the cloud computing environment 170-1 and the remote sub-flow in the cloud computing environment 170-2 for all the components are merged, for example, by the cloud management module 172-1. At step 344, the results are correlated, for example, by the cloud management module 172-1. In some embodiments, for a tunnel down event, the correlation of data is done by comparing the packets sent from the source with packets received from the target over time. In these embodiments, a sub-flow sends probes from an initiator to collect and measure the number of packets sent by the initiator. A sub-flow can also run at the destination to collect and measure packets received as they were sent by the initiator. Once both local and remote sub-flows complete, a final sub-flow can be run to correlate results/findings from both the sub-flows and a result report is generated, which shows whether there is a packet loss, etc. Consequently, routing issues with customer networks can be identified.

At step 346, a diagnostic report is generated, for example, by the cloud management module 172-1. Compared to a cloud-specific diagnostic scheme in which each cloud runs a diagnostic workflow individually at every cloud location and a user needs to manually collect results from different clouds, compare/contrast with against data from all nodes, and prepare final result, the cross-cloud diagnostic process illustrated in FIG. 3 automatically starts workflows across multiple clouds (e.g., the cloud computing environments 170-1, 170-2) to collect probe results from these multiple clouds and correlate result data into a comprehensive diagnostic report.

In some embodiments, the cross-cloud diagnostic process illustrated in FIG. 3 includes step 348 to correct one or more issues identified in the comprehensive diagnostic report generated at step 346. In an embodiment, the cross-cloud diagnostic process includes a policy-based automatic remediation to correct the identified issues in the multi-cloud system 100. For example, in case of a virtual appliance deployment failure due to tunnel down issue or certificate issue, the virtual appliance can be redeployed.

In some embodiments, the cross-cloud diagnostic process illustrated in FIG. 3 is periodically run to proactively identify potential issues before these issues even occur. For example, if there is a connection problem between the cloud management module 172-1 and the hypervisor 124, the connection problem can be identified before the migration of VMs even starts. An end-user can be notified to rectify the connection problem before proceeding with the migration.

Figure 4:
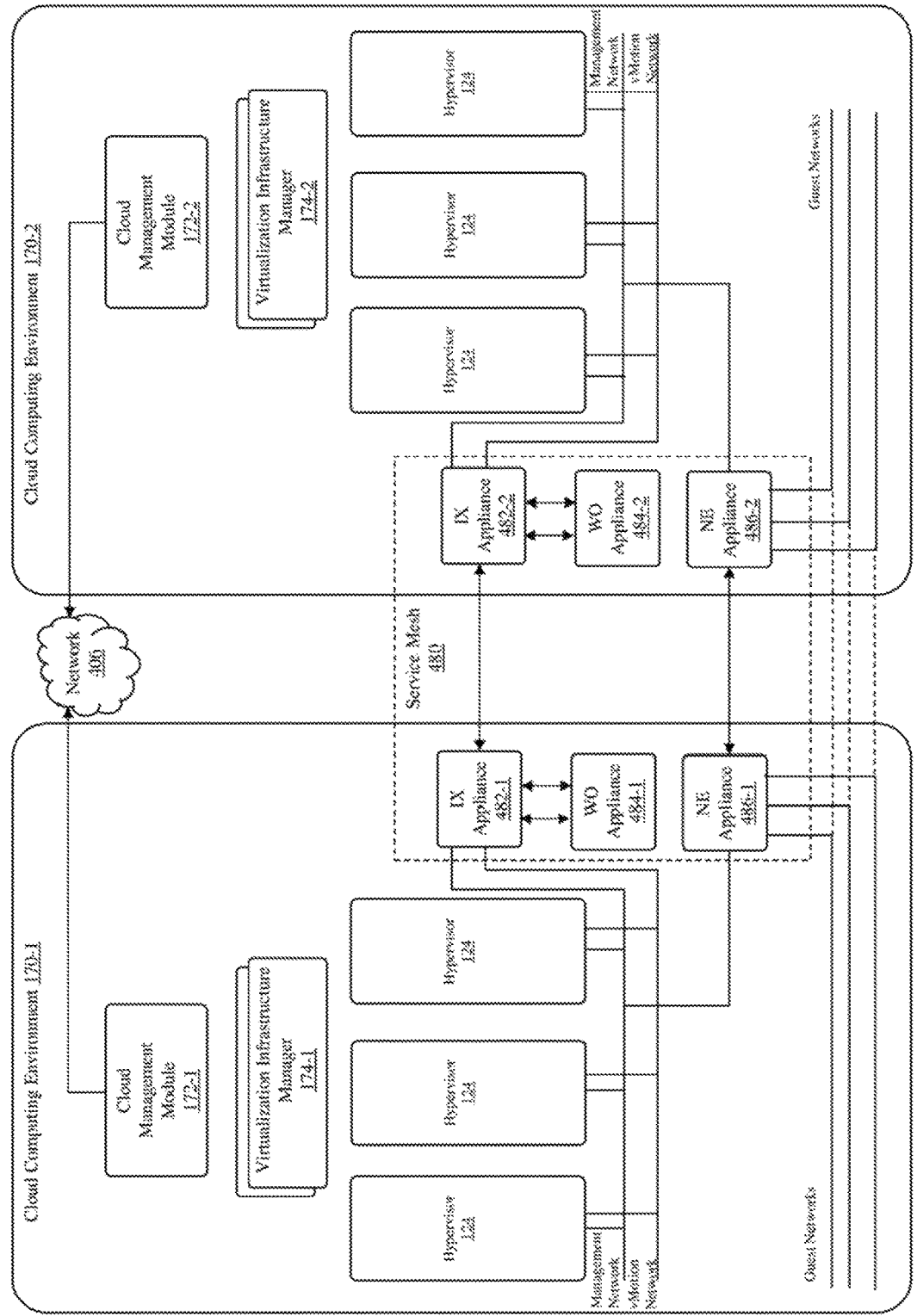
FIG. 4 depicts a detailed implementation of cloud computing environments that can be used to execute the cross-cloud diagnostic process illustrated in FIG. 3.

FIG. 4 depicts a detailed implementation of the cloud computing environment 170-1 and the cloud computing environment 170-2 that can be used to execute the cross-cloud diagnostic process illustrated in FIG. 3. Specifically, FIG. 4 depicts interconnections between the cloud computing environment 170-1 and the cloud computing environment 170-2. As shown in FIG. 4, the cloud management module 172-1 of the cloud computing environment 170-1 is connected to the cloud management module 172-2 of the cloud computing environment 170-2 through a network 406, which can be the Internet or other type of network. In FIG. 4, the cloud computing environment 170-1 includes the cloud management module 172-1, at least one virtualization infrastructure manager (VIM) 174-1, and one or more hypervisors 124, while the cloud computing environment 170-2 includes the cloud management module 172-2, at least one VIM 174-2, and one or more hypervisors 124. A service mesh 480, which includes Interconnect (IX), WAN Optimization (WO), and Network Extension (NE) virtual appliances 482-1, 484-1, 486-1 in the cloud computing environment 170-1 and IX, WO, and NE virtual appliances 482-2, 484-2, 486-2 in the cloud computing environment 170-2, is distributed across in the cloud computing environments 170-1, 170-2. In some embodiments, the IX virtual appliances 482-1, 482-2 create and secure connections between the cloud management modules 172-1, 172-2, supporting management, migration, replication, and disaster recovery operations. In some embodiments, the WO virtual appliances 484-1, 484-2 work with the IX virtual appliances 482-1, 482-2 to improve the network performance through a combination of deduplication, compression, and line conditioning techniques. In some embodiments, the NE virtual appliances 486-1, 486-2 extend virtual machine networks from a source site to a remote site. In the cloud management module 172-1, the hypervisors 124 are connected to connected to the IX appliance 482-1 through a management network and a VMware vSphere® vMotion® network and the NE appliance 486-1 are connected to guest networks and the corresponding management network. The IX appliance 482-1 of the cloud computing environment 170-1 is connected to the IX appliance 482-2 of the cloud computing environment 170-2, while the NE appliance 486-1 of the cloud computing environment 170-1 is connected to the NE appliance 486-2 of the cloud computing environment 170-2. In the cloud management module 172-2, the hypervisors 124 are connected to connected to the IX appliance 482-2 through a management network and a VMware vSphere® vMotion® network and the NE appliance 486-2 are connected to guest networks and the corresponding management network.

Figure 5:
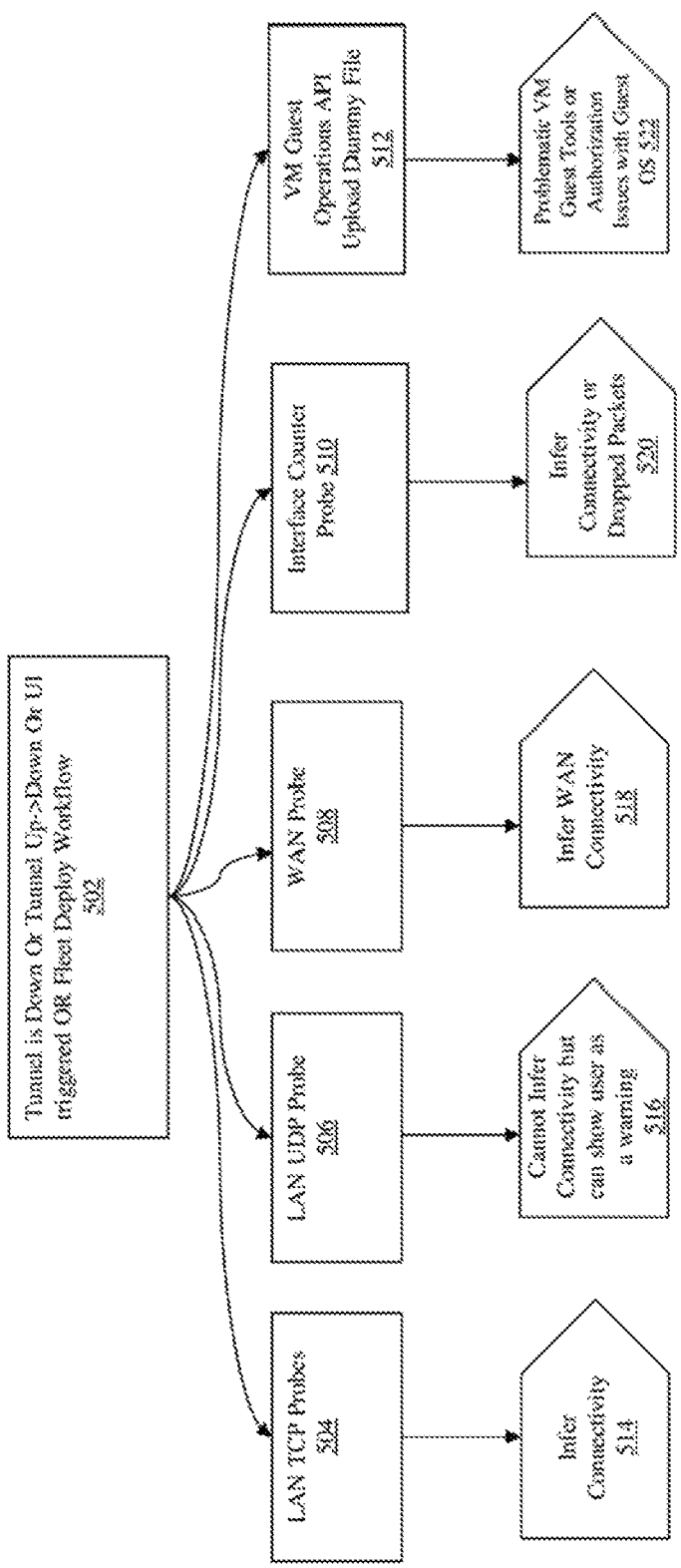
FIG. 5 depicts an event, probes that can be triggered by the event and results from the probes in accordance with the cross-cloud diagnostic process illustrated in FIG. 3.

FIG. 5 depicts an event, probes that can be triggered by the event and results from the probes of the cross-cloud diagnostic process illustrated in FIG. 3. As shown in FIG. 5, an event 502, such as tunnel down, tunnel from up to down, user interface (UI) triggered event, or an Interconnect deploy workflow, occurs in the multi-cloud system 100. The event 502 can trigger a local area network (LAN) Transmission Control Protocol (TCP) probe 504, a LAN User Datagram Protocol (UDP) probe 506, a wide area network (WAN) probe 508, an interface counter probe 510, and/or a VM Guest Operations API upload dummy file probe 512. In some embodiments, the WAN probe 508 is a tunnel probe, for example, a FoUtrace tunnel probe that performs a custom traceroute of a Foo over UDP (FoU) tunnel. The FoUtrace tunnel probe can be used to compensate for some of the peculiarities of IX/NE appliances and packet pipeline and suitable for producing a point-in-time trace. A possible result 514 from the LAN TCP probe 504 is "Infer Connectivity," which indicates a potential problem in network connection. A possible result 516 from the LAN UDP probe 506 is "Cannot Infer Connectivity but can show user as a warning," which indicates that a potential problem in network connection cannot be concluded and result information can be shown as a warning to an end user. A possible result 518 from the WAN probe 508 is "Infer WAN Connectivity," which indicates a potential problem in network connection, such as tunnels down across clouds. A possible result 520 from the interface counter probe 510 is "Infer Connectivity or Dropped Packets," which indicates a potential problem in network connection or dropped packets in networks. A possible result 522 from the VM Guest Operations API upload dummy file probe 512 is "Problematic VM Guest Tools or Authorization Issues with Guest OS," which indicates potential problems with VM guest tools or potential authorization issues with guest OS.

Figure 6:
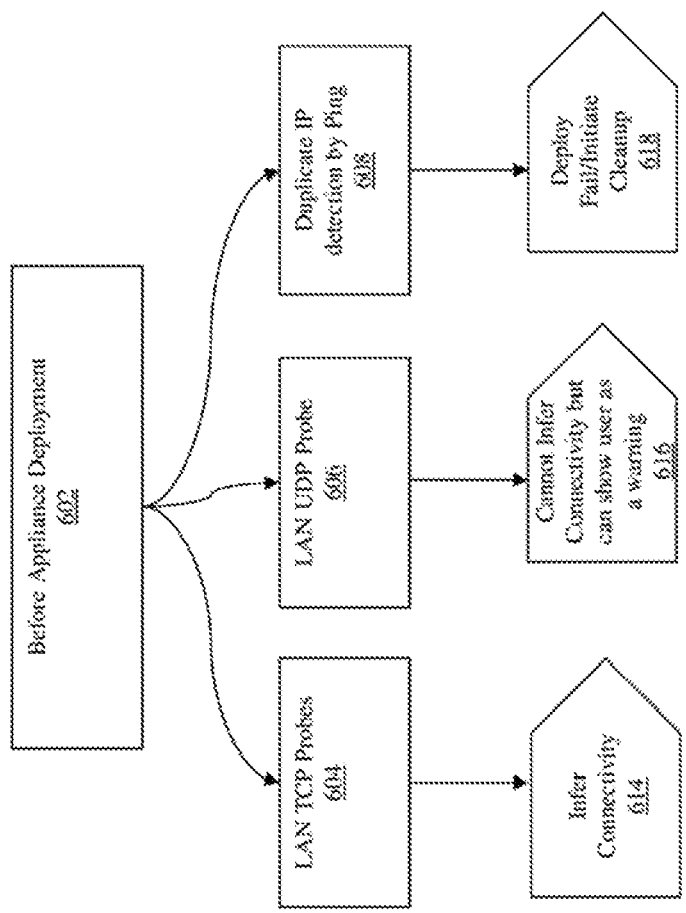
FIG. 6 depicts another event, probes that can be triggered by the event and results from the probes in accordance with the cross-cloud diagnostic process illustrated in FIG. 3.
Figure 7:
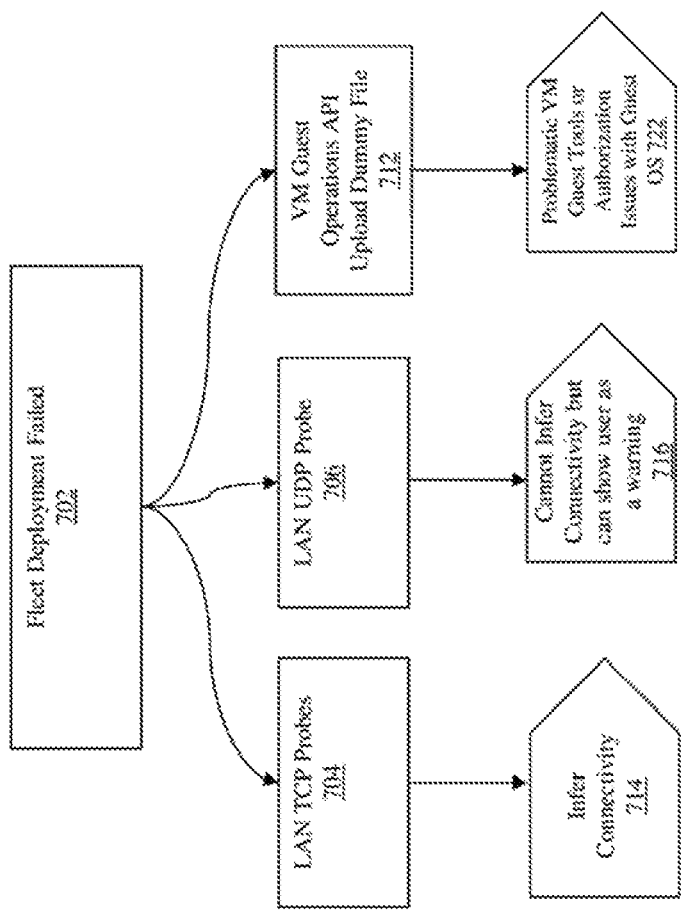
FIG. 7 depicts another event, probes that can be triggered by the event and results from the probes in accordance with the cross-cloud diagnostic process illustrated in FIG. 3.

FIG. 6 depicts another event, probes that can be triggered by the event and results from the probes of the cross-cloud diagnostic process illustrated in FIG. 3. As shown in FIG. 6, an event 602, such as a deployment of a virtual appliance or a planned deployment of a virtual appliance, occurs in the multi-cloud system 100. The event 602 can trigger a LAN TCP probe 604, a LAN UDP probe 606, and/or a duplicate IP detection probe (e.g., ping) 608. A possible result 614 from the LAN TCP probe 604 is "Infer Connectivity," which indicates a potential problem in network connection. A possible result 616 from the LAN UDP probe 606 is "Cannot Infer Connectivity but can show user as a warning," which indicates that a potential problem in network connection cannot be concluded and result information can be shown to an end user as a warning. A possible result/action 618 from the duplicate IP detection probe 608 is "Deploy Fail/Initiate Cleanup," which indicates an action or an intent to fail or abort the appliance deployment process and initiate cleanup FIG. 7 depicts another event, probes that can be triggered by the event and results from the probes of the cross-cloud diagnostic process illustrated in FIG. 3. As shown in FIG. 7, a failure event 702, such as Interconnect deployment failure of virtual appliances, occurs in the multi-cloud system 100. The event 702 can trigger a LAN TCP probe 704, a LAN UDP probe 706, and/or a VM Guest Operations API upload dummy file probe 712. A possible result 714 from the LAN TCP probe 604 is "Infer Connectivity," which indicates a potential problem in network connection. A possible result 716 from the LAN UDP probe 706 is "Cannot Infer Connectivity but can show user as a warning," which indicates that a potential problem in network connection cannot be concluded and result information can be shown to an end user as a warning. A possible result 722 from the VM Guest Operations API upload dummy file probe 712 is "Problematic VM Guest Tools or Authorization Issues with Guest OS," which indicates potential problems with VM guest tools or potential authorization issues with guest OS.

Figure 8:
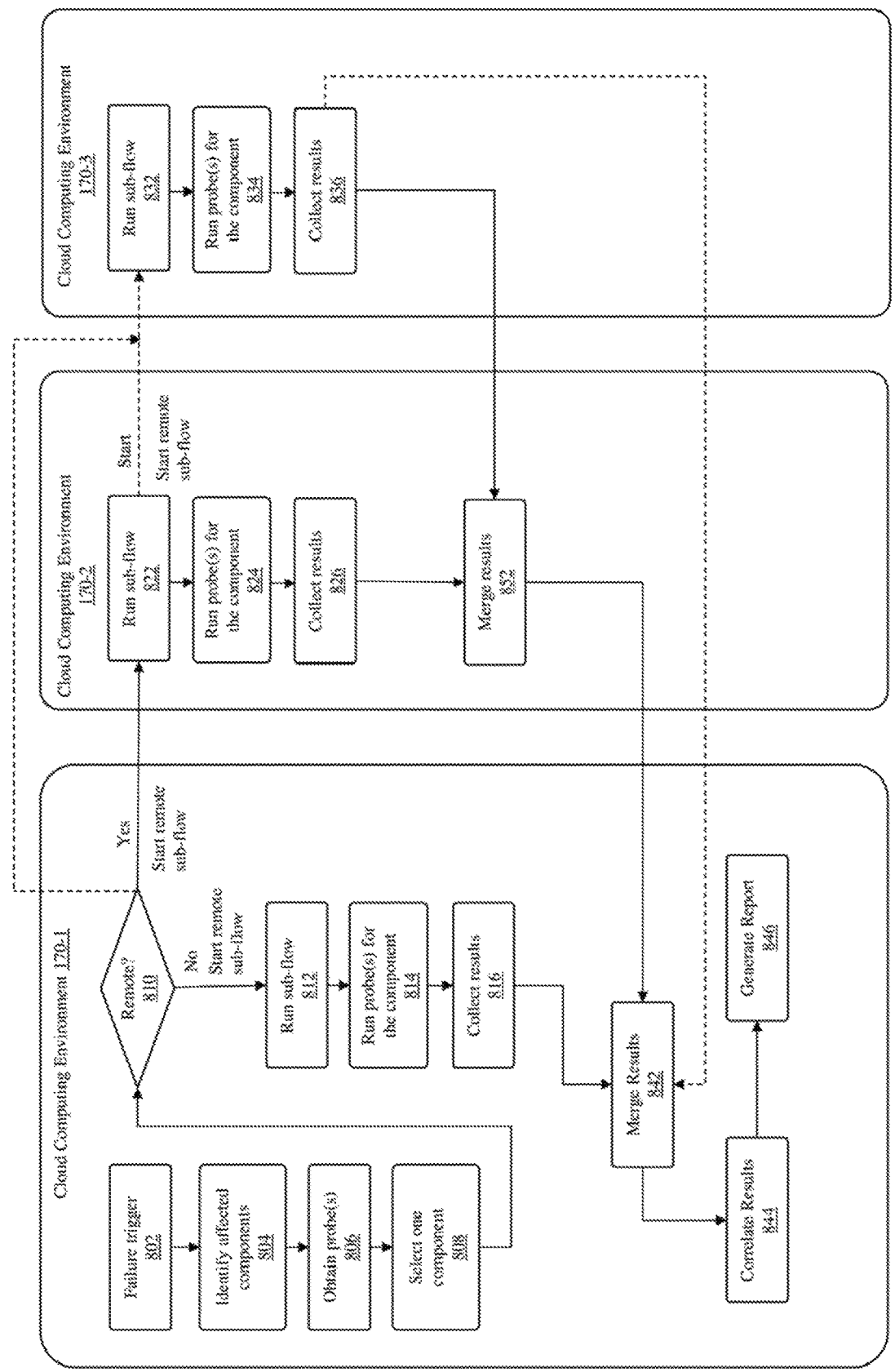
FIG. 8 is a flow diagram of a diagnostic process for a chain of connected clouds that can be implemented in the multi-cloud system 100 in accordance with various aspects of the invention.

FIG. 8 is a flow diagram of a diagnostic process for a chain of connected clouds that can be implemented in the multi-cloud system 100 in accordance with various aspects of the invention. The diagnostic process of FIG. 8 is different from the diagnostic process shown in FIG. 3 in that the diagnostic process of FIG. 8 can trigger diagnostics from the cloud computing environment 170-1 to diagnose issues in the interconnected cloud computing environments 170-2, 172-3. In the flow diagram shown in FIG. 8, the diagnostic process is triggered in the cloud computing environment 170-1 automatically upon a failure event, for example, a cross cloud migration failure occurred between the cloud computing environment 170-1 and the cloud computing environment 170-2 and/or a disaster recovery failure between the cloud computing environment 170-2 and the cloud computing environment 170-3. For example, the cloud management module 172-1 may run a diagnostic workflow in response to a failure event in the multi-cloud system 100. Depending on the failure event, the cloud management module 172-1 can identify the affected components and nodes within the cloud computing environment 170-1 or outside the cloud computing environment 170-1 and identify probes within the cloud computing environment 170-1 or outside the cloud computing environment 170-1 to run. A main workflow can begin from the cloud computing environment 170-1 (or wherever the operation is initiated) and construct one or more probes. The main workflow can then spawn one or more sub-workflows to be sent to one or more identified cloud locations to perform one or more additional actions. These sub-workflows may or may not run in parallel. Once all the sub-workflows are complete, the main workflow collects the results, correlates data and generates a report.

In the flow diagram shown in FIG. 8, the cross-cloud diagnostic process starts from step 802. At step 802, a diagnostic workflow is triggered by a failure event in the multi-cloud system 100, for example, in the cloud management module 172-1 of the cloud computing environment 170-1. At step 804, components in the multi-cloud system 100 that are affected by the failure event (e.g., components distributed in the cloud computing environments 170-1, 170-2, 170-3) are identified, for example, by the cloud management module 172-1. At step 806, based on affected components, probes are obtained or constructed, for example, by the cloud management module 172-1. At step 808, one of the affected component is selected for processing, for example, by the cloud management module 172-1.

At step 810, for each of the affected components, it is determined if the component is remote to the cloud computing environment 170-1 in which the diagnostic workflow is triggered. If the component is not remote (i.e., local) to the cloud computing environment 170-1 in which the diagnostic workflow is triggered, a local subflow (also referred to as a sub workflow) is started and run in the cloud computing environment 170-1, for example, by the cloud management module 172-1 at step 812. Subsequently, at step 814, probes for the component is run in the cloud computing environment 170-1, for example, by the cloud management module 172-1, and the corresponding results are collected at step 816.

If the component is remote to the cloud computing environment 170-1 in which the diagnostic workflow is triggered, a remote subflow is started and run in the cloud computing environment 170-2, for example, by the cloud management module 172-2 at step 822. Subsequently, at step 824, probes for the component is run in the cloud computing environment 170-2, for example, by the cloud management module 172-2. One or more additional subflows can be run if needed on one or more additional connected clouds. The corresponding results are collected at step 826.

If the component is remote to the cloud computing environment 170-2, a remote subflow is started and run in the cloud computing environment 170-3, for example, by the cloud management module 172-3 at step 832. Subsequently, at step 834, probes for the component is run in the cloud computing environment 170-3, for example, by the cloud management module 172-3. One or more additional subflows can be run if needed on one or more additional connected clouds. The corresponding results are collected at step 836.

At step 852, results collected from the remote subflow in the cloud computing environment 170-2 and the remote subflow in the cloud computing environment 170-3 for all the components are merged, for example, by the cloud management module 172-2. At step 842, results collected from the local subflow in the cloud computing environment 170-1 for all the components and merged results from the cloud computing environment 170-2 and the cloud computing environment 170-3 are merged, for example, by the cloud management module 172-1. At step 844, the results are correlated, for example, by the cloud management module 172-1. In some embodiments, for a tunnel down event, the correlation of data is done by comparing the packets sent from the source with packets received from the target over time. In these embodiments, a subflow sends probes from an initiator to collect and measure the number of packets sent by initiator. A subflow can also run at the destination to collect and measure packets received as they were sent by initiator. Once both sub-workflows complete, a final subflow runs to correlate results/findings from both the sub-workflows and a result report is generated, which shows whether there is a packet loss etc. Consequently, routing issues with customer networks can be identified. At step 846, a diagnostic report is generated, for example, by the cloud management module 172-1. Compared to a cloud-specific diagnostic scheme in which each cloud runs a diagnostic flow individually at every cloud location and a user needs to manually collect results from different clouds, compare/contrast with against data from all nodes, and prepare final result, the diagnostic process illustrated in FIG. 8 automatically starts work flows across a chain of interconnected clouds (e.g., the cloud computing environments 170-1, 170-2, 170-3) to collect probe results from the chain of interconnected clouds and correlate result data into a comprehensive diagnostic report.

FIGS. 9A-9F depict a list of examples of triggers and probes that can be used by the diagnostic processes illustrated in FIGS. 3 and 8. As depicted in FIG. 16, sixteen HCX triggers and corresponding probes of different types (e.g., Network Service Provider (NSP) or Hybrid Cloud Manager (HCM)) that can be configurable dynamically. HCX is a distributed system provided by VMware, Inc, which allows users to connect clouds via multi-site interconnect Service Mesh deployment to provide a secure optimized transport fabric. The probes can be used to determine a status of the multi-cloud system 100. For example, based on some of the probes e.g., Foutrace, LAN TCP Probes, or the tracking of interface counters of Uplink interfaces on the HCX IX Appliance, network connectivity status can be inferred.

Figure 10:
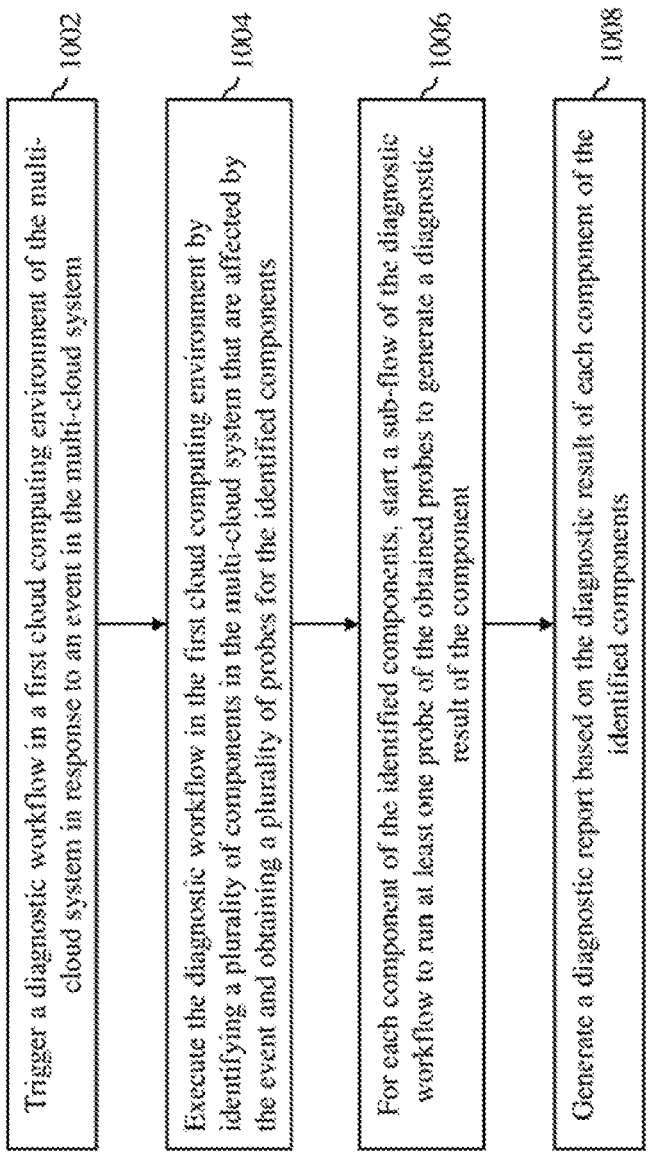
FIG. 10 is a flow diagram of a computer-implemented method for performing diagnostics in a multi-cloud system in accordance with an embodiment of the invention.

A computer-implemented method for performing diagnostics in a multi-cloud system in accordance with an embodiment of the invention is described with reference to a flow diagram of FIG. 10. At block 1002, a diagnostic workflow is triggered in a first cloud computing environment of the multi-cloud system in response to an event in the multi-cloud system. At block 1004, executing the diagnostic workflow in the first cloud computing environment by identifying components in the multi-cloud system that are affected by the event and obtaining probes for the identified components. At block 1006, for each component of the identified components, a sub-flow of the diagnostic workflow is started to run at least one probe of the obtained probes to generate a diagnostic result of the component. At block 1008, a diagnostic report is generated based on the diagnostic result of each component of the identified components.

The components of the embodiments as generally described in this document and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blu-ray disc.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A computer-implemented method for performing diagnostics in a multi-cloud system, the method comprising:
triggering a diagnostic workflow in a first cloud computing environment of the multi-cloud system in response to an event in the multi-cloud system that also includes a second cloud computing environment, wherein the event is one of a plurality of predefined events and wherein each of the first and second cloud computing environments is one of a private cloud and a public cloud;

executing the diagnostic workflow in the first cloud computing environment, wherein executing the diagnostic workflow in the first cloud computing environment comprises:

identifying a plurality of components in the multi-cloud system that are affected by the event, wherein a first component of the plurality of components is located in the first cloud computing environment and a second component of the plurality of components is located in the second cloud computing environment, wherein the first component is different than the second component, and wherein the components include virtualization infrastructure managers and hypervisors; and obtaining a plurality of probes for the identified components, wherein at least one of the probes is a software program that can be inserted in or adjacent to a particular identified component of the identified components to indicate a potential problem in network connection;

when the first component of the identified components is determined to be local to the first cloud computing environment of the multi-cloud system, starting a first sub-flow of the diagnostic workflow in the first cloud computing environment of the multi-cloud system according to the first component in the first cloud computing environment to run a first probe of the obtained probes to generate a diagnostic result of the first component;

when the second component of the identified components is determined to be in the second cloud computing environment of the multi-cloud system, starting a second sub-flow of the diagnostic workflow in the second cloud computing environment of the multi-cloud system according to the second component in the second cloud computing environment to run a second probe of the obtained probes to generate another diagnostic result of the second component, wherein the second probe is different than the first probe, and wherein the second sub-flow is spawned in response to the event during the execution of the diagnostic workflow in the first cloud computing environment and sent to the second cloud computing environment; and generating a diagnostic report based on the diagnostic result of each component of the identified components by correlating a plurality of diagnostic results from the different cloud computing environments of the multi-cloud system and generating the diagnostic report based on the correlated diagnostic results.

2. The method of claim 1, wherein the sub-flow of the diagnostic workflow in the first cloud computing environment of the multi-cloud system is executed by a first cloud management module in the first cloud computing environment and wherein the second sub-flow of the diagnostic workflow in the second cloud computing environment of the multi-cloud system is executed by a second cloud management module in the second cloud computing environment, the first and second cloud management modules being configured to abstract computing resources of the first and second cloud computing environments and present the computing resources as one continuous cloud.

3. The method of claim 1, wherein the event in the multi-cloud system is a deployment or planned deployment of a virtual appliance in the multi-cloud system and wherein the at least one probe is a local area network (LAN) Transmission Control Protocol (TCP) probe, a LAN User Datagram Protocol (UDP) probe or a duplicate Internet Protocol (IP) detection probe.

4. The method of claim 1, further comprising performing a remedy action in the multi-cloud system based on the diagnostic report.

5. The method of claim 1, wherein the event in the multi-cloud system is a deployment failure of virtual appliances in the multi-cloud system and wherein the at least one probe is a local area network (LAN) Transmission Control Protocol (TCP) probe, a LAN User Datagram Protocol (UDP) probe or a virtual machine guest operations application programming interface (API) upload dummy file probe.

6. The method of claim 1, wherein the at least one probe comprises one of a local area network (LAN) Transmission Control Protocol (TCP) probe, a LAN User Datagram Protocol (UDP) probe, a wide area network (WAN) trace probe, a virtual machine guest operation probe, and an interface counter probe.

7. The method of claim 1, further comprising periodically triggering a second diagnostic workflow in the multi-cloud system.

8. A non-transitory computer-readable storage medium containing program instructions for performing diagnostics in a multi-cloud system, wherein execution of the program instructions by one or more processors causes the one or more processors to perform steps comprising:

triggering a diagnostic workflow in a first cloud computing environment of the multi-cloud system in response to an event in the multi-cloud system that also includes a second cloud computing environment, wherein the event is one of a plurality of predefined events and wherein each of the first and second cloud computing environments is one of a private cloud and a public cloud;

executing the diagnostic workflow in the first cloud computing environment, wherein executing the diagnostic workflow in the first cloud computing environment comprises:

identifying a plurality of components in the multi-cloud system that are affected by the event, wherein a first component of the plurality of components is located in the first cloud computing environment and a second component of the plurality of components is located in the second cloud computing environment, wherein the first component is different than the second component, and wherein the components include virtualization infrastructure managers and hypervisors; and obtaining a plurality of probes for the identified components, wherein at least one of the probes is a software program that can be inserted in or adjacent to a particular identified component of the identified components to indicate a potential problem in network connection;

when the first component of the identified components is determined to be local to the first cloud computing environment of the multi-cloud system, starting a first sub-flow of the diagnostic workflow in the first cloud computing environment of the multi-cloud system according to the first component in the first cloud computing environment to run a first probe of the obtained probes to generate a diagnostic result of the first component;

when the second component of the identified components is determined to be in the second cloud computing environment of the multi-cloud system, starting a second sub-flow of the diagnostic workflow in the second cloud computing environment of the multi-cloud system according to the second component in the second cloud computing environment to run a second probe of the obtained probes to generate another diagnostic result of the second component, wherein the second probe is different than the first probe, and wherein the second sub-flow is spawned in response to the event during the execution of the diagnostic workflow in the first cloud computing environment and sent to the second cloud computing environment; and generating a diagnostic report based on the diagnostic result of each component of the identified components by correlating a plurality of diagnostic results from the different cloud computing environments of the multi-cloud system and generating the diagnostic report based on the correlated diagnostic results.

9. The non-transitory computer-readable storage medium of claim 8, wherein the sub-flow of the diagnostic workflow in the first cloud computing environment of the multi-cloud system is executed by a first cloud management module in the first cloud computing environment and wherein the second sub-flow of the diagnostic workflow in the second cloud computing environment of the multi-cloud system is executed by a second cloud management module in the second cloud computing environment, the first and second cloud management modules being configured to abstract computing resources of the first and second cloud computing environments and present the computing resources as one continuous cloud.

10. The non-transitory computer-readable storage medium of claim 8, wherein the event in the multi-cloud system is a deployment or planned deployment of a virtual appliance in the multi-cloud system and wherein the at least one probe is a local area network (LAN) Transmission Control Protocol (TCP) probe, a LAN User Datagram Protocol (UDP) probe or a duplicate Internet Protocol (IP) detection probe.

11. The non-transitory computer-readable storage medium of claim 8, wherein the steps further comprise performing a remedy action in the multi-cloud system based on the diagnostic report.

12. The non-transitory computer-readable storage medium of claim 8, wherein the event in the multi-cloud system is a deployment failure of virtual appliances in the multi-cloud system and wherein the at least one probe is a local area network (LAN) Transmission Control Protocol (TCP) probe, a LAN User Datagram Protocol (UDP) probe or a virtual machine guest operations application programming interface (API) upload dummy file probe.

13. The non-transitory computer-readable storage medium of claim 8, wherein the at least one probe comprises one of a local area network (LAN) Transmission Control Protocol (TCP) probe, a LAN User Datagram Protocol (UDP) probe, a wide area network (WAN) trace probe, a virtual machine guest operation probe, and an interface counter probe.

14. The non-transitory computer-readable storage medium of claim 8, wherein the steps further comprise periodically triggering a second diagnostic workflow in the multi-cloud system.

15. A system for performing diagnostics in a multi-cloud system, the system comprising:
memory; and
one or more processors configured to:
trigger a diagnostic workflow in a first cloud computing environment of the multi-cloud system in response to an event in the multi-cloud system that also includes a second cloud computing environment, wherein the event is one of a plurality of predefined events and wherein each of the first and second cloud computing environments is one of a private cloud and a public cloud;
execute the diagnostic workflow in the first cloud computing environment by identifying a plurality of components in the multi-cloud system that are affected by the event and obtaining a plurality of probes for the identified components, wherein a first component of the plurality of components is located in the first cloud computing environment and a second component of the plurality of components is located in the second cloud computing environment, wherein the first component is different than the second component, wherein the components include virtualization infrastructure managers and hypervisors and wherein at least one of the probes is a software program that can be inserted in or adjacent to a particular identified component of the identified components to indicate a potential problem in network connection;
when the first component of the identified components is determined to be local to the first cloud computing environment of the multi-cloud system, start a first sub-flow of the diagnostic workflow in the first cloud computing environment of the multi-cloud system according to the first component in the first cloud computing environment to run a first probe of the obtained probes to generate a diagnostic result of the first component;
when the second component of the identified components is determined to be in the second cloud computing environment of the multi-cloud system, start a second sub-flow of the diagnostic workflow in the second cloud computing environment of the multi-cloud system according to the second component in the second cloud computing environment to run a second probe of the obtained probes to generate another diagnostic result of the second component, wherein the second sub-flow is spawned in response to the event during the execution of the diagnostic workflow in the first cloud computing environment and sent to the second cloud computing environment; and
generate a diagnostic report based on the diagnostic result of each component of the identified components by correlating a plurality of diagnostic results from the different cloud computing environments of the multi-cloud system and generating the diagnostic report based on the correlated diagnostic results.

16. The system of claim 15, wherein the sub-flow of the diagnostic workflow in the first cloud computing environment of the multi-cloud system is executed by a first cloud management module in the first cloud computing environment and wherein the second sub-flow of the diagnostic workflow in the second cloud computing environment of the multi-cloud system is executed by a second cloud management module in the second cloud computing environment, the first and second cloud management modules being configured to abstract computing resources of the first and second cloud computing environments and present the computing resources as one continuous cloud.

17. The system of claim 15, wherein the event in the multi-cloud system is a deployment or planned deployment of a virtual appliance in the multi-cloud system and wherein the at least one probe is a local area network (LAN) Transmission Control Protocol (TCP) probe, a LAN User Datagram Protocol (UDP) probe or a duplicate Internet Protocol (IP) detection probe.

18. The system of claim 15, wherein the one or more processors are further configured to perform a remedy action in the multi-cloud system based on the diagnostic report.

19. The system of claim 15, wherein the event in the multi-cloud system is a deployment failure of virtual appliances in the multi-cloud system and wherein the at least one probe is a local area network (LAN) Transmission Control Protocol (TCP) probe, a LAN User Datagram Protocol (UDP) probe or a virtual machine guest operations application programming interface (API) upload dummy file probe.

20. The system of claim 15, wherein the at least one probe comprises one of a local area network (LAN) Transmission Control Protocol (TCP) probe, a LAN User Datagram Protocol (UDP) probe, a wide area network (WAN) trace probe, a virtual machine guest operation probe, and an interface counter probe.

* * * * *